*INVENTOR.*
HENRY A. PACE

United States Patent Office 2,744,042
Patented May 1, 1956

2,744,042
LAMINATED PANELS

Henry A. Pace, Akron, Ohio, assignor, by mesne assignments, to The Goodyear Tire & Rubber Company, a corporation of Ohio Application June 21, 1951, Serial No. 232,691

4 Claims. (Cl. 154—75)

This invention relates to the fabrication of laminated sandwich panels and is particularly concerned with an improved method for manufacturing panels wherein a honeycomb spacer is filled with a foamed resin.

Prior practices in the laminating field have been directed toward obtaining a combination of desirable characteristics, namely, maximum structural strength coupled with minimum density. In certain uses for laminated structures additional characteristics are essential, for example, fire resistance, good electrical properties, good insulating characteristics, and impact resistance.

Various attempts have been made to fabricate a structure embodying these desirable characteristics. Nevertheless, it has been customary to sacrifice strength to obtain low density or to sacrifice low density to obtain maximum strength. In certain desirable uses for laminated structures, the incorporation of these optimum conditions in a practical laminated structure has been impossible or impractical, as, for example, in the fabrication of radar canopies, guided missile parts, airplane components, and other specific uses.

It is, accordingly, an object of this invention to provide a structure characterized by the presence of a porous filler which combines maximum strength and minimum density.

It is another object of this invention to provide a laminate wherein a foamed resin is disposed within the interstices of a honeycomb structure in order to secure minimum density and still retain great strength, impact resistance, and desirable electrical properties.

A further object of this invention is to fabricate such a laminate which resists thermal and structural distortion and which has good heat-insulating characteristics.

Still another object of this invention is to provide a method for preparing laminated sandwich panels having superior physical characteristics.

In the practice of this invention, outer facing sheets, or skins, are prepared in the customary manner. Such sheets can be made of paper, sheet metal, wood, glass fiber laminates or other sheeted materials. The outer skin material is quite generally selected in view of the use contemplated for the finished product. Woven glass fiber laminates are preferred in the practice of this invention.

Honeycomb type spacers can be prepared according to one of the generally accepted practices. For example, strips of material can be spot-glued, expanded to the desired honeycomb structure, and held in flexed position by resin impregnation. Alternatively, they may be molded from resin-impregnated materials or they may be constructed by shaping flat sheets on a mandrel. Impregnated paper, impregnated cloth woven from glass fibers, shaped aluminum and other similar materials may be employed in preparing the honeycomb spacers used in practicing this invention. Shaped laminated woven fibrous glass is generally preferred in fabricating panels according to the teachings of this invention. The size of the open-ended cells of the honeycomb is not critical but a reasonable proportion between the size of the cell and the size of the finished product should be maintained. For example, the transverse ribs may divide the structure into any number of cells between two and such a multitude as to unduly restrain the rise of the foam. Both of these extremes should be avoided.

The foamable mixture should be thermosetting and interiorly cohesive as well as capable of adhesion to the spacer walls and the facing sheets. In the practice of this invention, the use of an alkyd resin, blown by means of a polyisocyanate, is preferred. The foamable material can be placed on one skin or facing sheet to a depth calculated to give the desired foam density in the finished product. For example, a given foaming mixture one-fifth the height of the honeycomb spacer will produce a foam having a density of approximately 10 pounds per cubic foot. This ratio is preferably preliminarily established for each foamable mixture employed.

The honeycomb, or spacer element, is placed adjacent a skin with the open-ended spacer cell walls in substantially perpendicular relation to the skin and with the foamable material retained within the cellular spaces. The other skin is then placed on top of the honeycomb spacer. The entire assembly is held in rigid relationship between the platens of a press or by means of plates and C clamps. The foamable material is then foamed and jelled by means of heat which may be supplied by any conventional heating means. It is generally desirable to confine the honeycomb with end and side shims to prevent rupture of the walls during the foaming operation because internal pressure as high as 30 p. s. i. gauge may be generated.

In this manner, a superior laminated structure is fabricated which is characterized by the high tensile strength of the foam and the strong bond between the foam and the facing sheets. This unusual strength is due primarily to the restrained foaming which creates a finer cellular structure within the foam, as more particularly set forth hereinafter. A number of plies may be laminated together simultaneously in order to fabricate a multiple sandwich panel of even greater strength.

The invention is more particularly described below in connection with the accompanying drawings wherein.

Figure 1:
Figure 1 is an elevation partly in section of a facing member with a layer of foamable mixture placed thereon.
Figure 2:
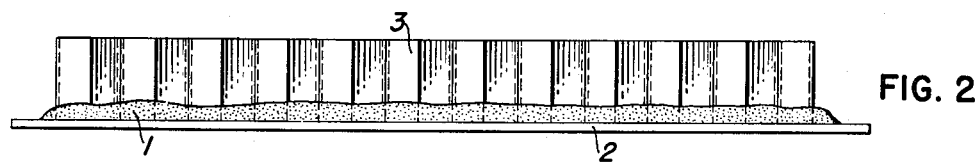
Figure 2 is a side elevation showing a honeycomb spacer in place.
Figure 3:
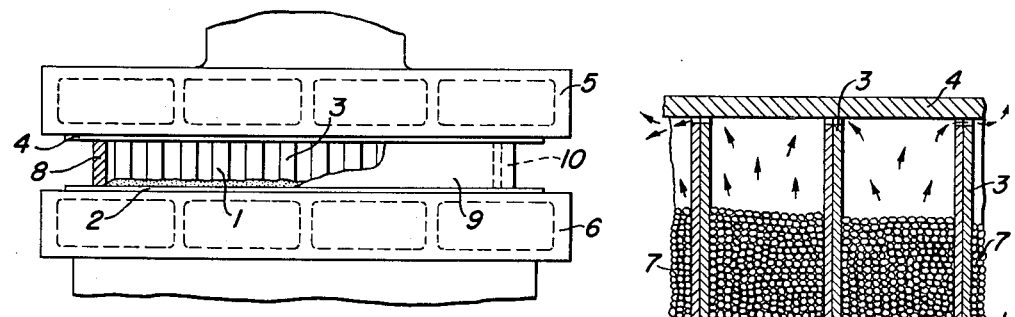
Figure 3 is a view in elevation showing a sandwich panel between the platens of a conventional press.
Figure 4:
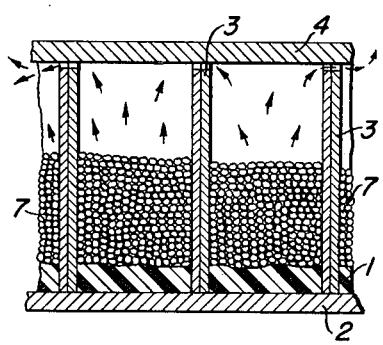
Figure 4 is a cut-away section, showing foam in the course of rising during the blowing operation.
Figure 5:
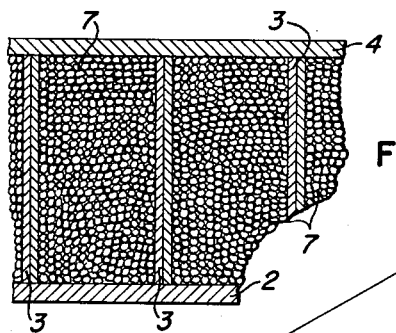
Figure 5 is a fragmentary sectional view of the finished laminate.
Figure 6:
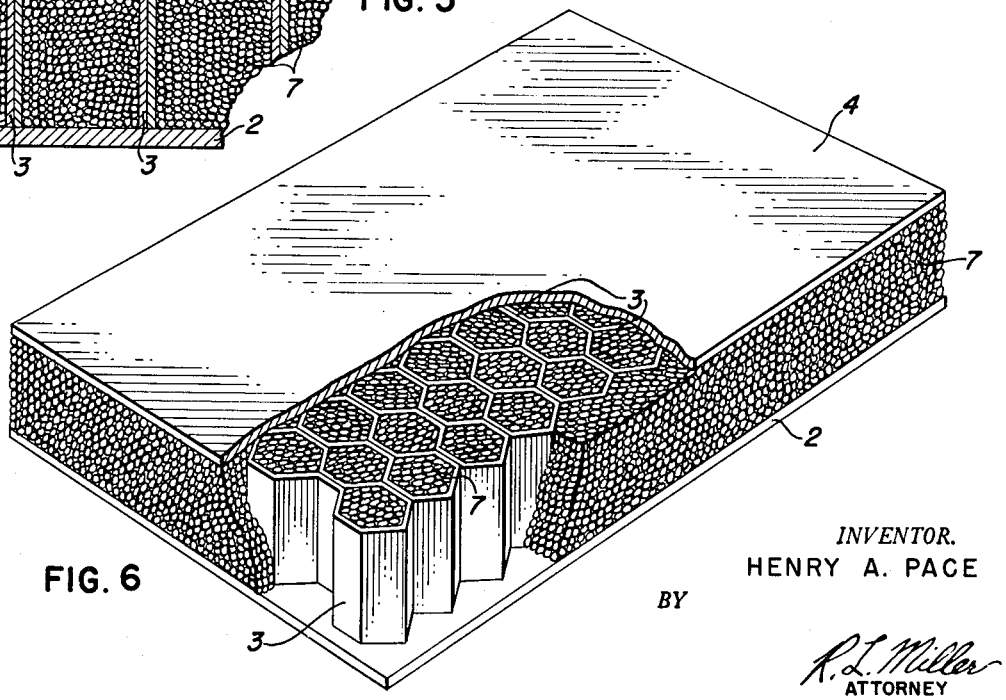
Figure 6 is a perspective view of the finished laminate showing a fragmentary portion of the foam-filled spacer interstices.

Referring to the drawings, the previously prepared foamable material 1 is placed on the previously prepared lower facing skin 2. A honeycomb structure 3 is then pushed through the foamable material until it is substantially adjacent the facing skin and substantially perpendicular thereto. The upper facing skin 4 is then placed in position over the honeycomb spacer member and the entire assembly placed between the platen members 5 and 6 of a press, as shown in Figure 3. Heat is then applied to foam the material and fill the interstices of the spacer with foam 7 while holding the facing skins 2 and 4 in parallel spaced relation.

In the practice of the invention, the upper facing skin 4 is held in fixed relationship with the spacer element 3, but loosely enough to allow the escape of entrapped air as the foam rises in the interstices. Likewise, confining side shims or side boards, 8, 9 and 10, shown in Figure 3, and the fourth side shim, which is not shown, are held in fixed relation to the facing sheets of the laminate, but loosely enough to allow the escape of entrapped air. These shims are fixedly connected to each other so as to confine the foam laterally to prevent rupture of the cell walls during the foaming operation. As the foam rises during gas evolution, the spaces between the honeycomb and the facing sheets and the spaces between the confining shims and the facing sheets become filled with foam, thus preventing escape of gas and creating a restraint on the foam while the blow is being completed. This procedure makes for a finer, more uniform cell structure and creates good cohesion within the foam as well as good adhesion between the foam and the facing skins. The final result is a structure having greater strength for the same density than related structures heretofore manufactured.

The invention is illustrated by the following examples:

Example 1

A foaming mixture was prepared by mixing together the following materials:

| | |
|---|---|
| Glycerol adipate phthalate alkyd resin_____grams__ | 75 |
| 2,4-tolylene diisocyanate_____do____ | 70 |
| Water _____cc__ | .5 |

A wooden frame 5" x 5" x ⅜" and a laminated woven glass fiber honeycomb structure having sufficient free space to hold a calculated amount of foam were made ready. The foamable mixture was poured upon a previously prepared sanded glass fiber skin within the confines of the frame, and allowed to level out. The previously warmed honeycomb was then pressed into place. A second sanded glass fiber skin was placed upon the honeycomb and the assembly was clamped together between reinforced aluminum plates. The foamable material was then blown by heating for one hour at a temperature of 150° F. followed by two hours at 275° F.

A cross section through the laminated panel prepared above showed very uniform foam structure and extremely strong adhesion between the foam and the spacer cell walls and between the foam and the facing sheets.

Example 2

| | Grams |
|---|---|
| Homogeneous mixture of unsaturated alkyd resin and styrene in a ratio of about 1 part resin to 2 parts styrene_____ | 60 |
| 2,4-Tolylene diisocyanate _____ | 9 |
| Benzoyl peroxide _____ | 2 |
| Water _____ | 1 |
| Sodium lauryl sulfonate_____ | 0.2 |

The alkyd resin was prepared by reacting fumaric or maleic acid and glycol. A sandwich panel was fabricated from the foamable mixture as in Example 1. This panel likewise showed uniformity of cell structure, strong cohesive strength within the foam, excellent adhesion between the foam and the structure elements and exhibited good heat-insulation qualities.

The invention may be practiced with various alkyd resins, these being the condensation products of polyhydric alcohols and polycarboxylic acids. Representative polyhydric alcohols which can be used in preparing alkyd resins for use in the practice of this invention are ethylene glycol, triethylene glycol, propylene glycol, dipropylene glycol, hexamethylene glycol, pinacol, and glycerol. Representative polycarboxylic acids which can be used in preparing alkyd resins by reaction with any of the above-mentioned polyhydric alcohols and others are phthalic, isophthalic, terephthalic, succinic, adipic, sebacic, maleic, fumaric, 2-phenylglutaric, citric, citraconic, mesaconic, itaconic, oxalic, malonic, glutaric, pimelic, suberic, azelaic and sebacic acids. It is possible to substitute ester-forming derivatives, such as the anhydrides, the simple esters and the like for the acids themselves. Also certain monofunctional modifiers can be incorporated in the resin according to the known art. In order to have sufficient carboxyl radicals available to react with the isocyanates, it is desirable to keep the acid number of the alkyd resin within a range of 35 to 45.

In the practice of this invention, foaming is obtained by reacting an isocyanate with the carboxyl groups of the alkyd resins and with any water which may be present in the resin. The isocyanate employed may be aliphatic or aromatic and in order to facilitate mixing should be liquid at normal temperatures. Representative isocyanates which can be used in preparing the foamable mixture are 2,4-tolylene diisocyanate, hexamethylene diisocyanate, diphenylmethane diisocyanate, etc.

While certain representative embodiments and details have been shown for the purpose of illustrating the invention, it will be apparent to those skilled in this art that various changes and modifications may be made therein without departing from the spirit or scope of the invention.

I claim:

1. The method of preparing a laminated sandwich structure comprising the steps of (1) placing a thin layer of a foamable mixture prepared from a foamable alkyd resin having an acid number of 35 to 45 and an isocyanate blowing agent on a facing sheet and pressing a rigid uniform honeycomb spacer element embodying a plurality of open-ended cells into the foamable mixture, (2) placing another facing sheet on top of the spacer element and confining the sandwich structure between limiting platen members, and, (3) completing the sandwich structure by expanding the foamable mixture until the interstices of the spacer element are substantially completely filled with foam and the spacer walls are adhesively joined thereby to each other and to the facing sheets.

2. The process according to claim 1 wherein a plurality of plies are simultaneously foamed together.

3. The method of preparing a laminated structure comprising the steps of (1) placing a foamable mixture between a pair of confining laminae and within the interstices of a honeycomb spacer element, said foamable mixture filling about one-fifth of the volume contained between the laminae and being comprised of an alkyd resin having an acid number of 35 to 45 and a liquid isocyanate blowing agent, said honeycomb spacer element embodying a plurality of uniform open-ended cells positioned in substantially perpendicular relation to the confining laminae and in adjacent relation thereto, and (2) heating said foamable mixture at a temperature of 150° F. to 275° F. to decompose the isocyanate and to cause the alkyd resin to expand within the interstices of the honeycomb spacer element until said interstices are completely foam filled and the confining laminae are adhesively joined by the alkyd resin foam.

4. The method of preparing a laminated structure comprising the steps of (1) placing a foamable mixture betweene a pair of confining laminae and within the interstices of a honeycomb spacer element, said foamable mixture filling about one-fifth of the volume contained between the laminae and being comprised of an alkyd resin having an acid number of 35 to 45 and a liquid diisocyanate blowing agent, said honeycomb spacer element embodying a plurality of uniform open-ended cells positioned in substantially perpendicular relation to the confining laminae and in adjacent relation thereto, and (2) heating said foamable mixture at a temperature of 150° F. to 275° F. to decompose the diisocyanate and to cause the alkyd resin to expand within the interstices of the honeycomb spacer element until said interstices are completely foam filled and the confining laminae are adhesively joined by the alkyd resin foam.

References Cited in the file of this patent

UNITED STATES PATENTS

| | | |
|---|---|---|
| 1,942,989 | Thomson | Jan. 9, 1934 |
| 2,056,563 | Budd et al. | Oct. 6, 1936 |
| 2,376,653 | Boyer | May 22, 1945 |
| 2,442,940 | Staudinger et al. | June 8, 1948 |
| 2,493,032 | Rheinfrank | Jan. 3, 1950 |
| 2,512,364 | Moxness | June 20, 1950 |
| 2,576,073 | Kropa et al. | Nov. 20, 1951 |
| 2,577,279 | Simon et al. | Dec. 4, 1951 |
| 2,602,783 | Simon et al. | July 8, 1952 |
| 2,639,252 | Simon et al. | May 19, 1953 |

FOREIGN PATENTS

| | | |
|---|---|---|
| 577,705 | Great Britain | May 29, 1946 |
| 577,790 | Great Britain | May 31, 1946 |

OTHER REFERENCES

"German Plastics Practice" published by DeBell and Ricardson, Springfield, Mass. in 1946; pp. 463–465.

"Isocyanate-Based Adhesives" article published by Monsanto Chem. Co., St. Louis, Missouri, pp. 3 and 4.